United States Patent
Kanade et al.

(10) Patent No.: US 12,078,537 B2
(45) Date of Patent: Sep. 3, 2024

(54) SYSTEM AND METHOD FOR FINDING THE PEAK WAVELENGTH OF THE SPECTRUM SENSED BY AN LSPR SPECTROMETER

(71) Applicant: Nicoya Lifesciences Inc., Kitchener (CA)

(72) Inventors: Udayan Kanade, Pune (IN); Sanat Ganu, Pune (IN)

(73) Assignee: Nicoya Lifesciences Inc., Kitchener (CA)

( * ) Notice: Subject to any disclaimer, the term of this patent is extended or adjusted under 35 U.S.C. 154(b) by 0 days.

(21) Appl. No.: 18/549,489

(22) PCT Filed: Mar. 1, 2022

(86) PCT No.: PCT/CA2022/050291
§ 371 (c)(1),
(2) Date: Sep. 7, 2023

(87) PCT Pub. No.: WO2022/187931
PCT Pub. Date: Sep. 15, 2022

(65) Prior Publication Data
US 2024/0175749 A1    May 30, 2024

Related U.S. Application Data (60) Provisional application No. 63/158,214, filed on Mar. 8, 2021.

(51) Int. Cl.
*G01J 3/28* (2006.01)
*G01N 21/552* (2014.01)

(52) U.S. Cl.
CPC .............. *G01J 3/28* (2013.01); *G01N 21/554* (2013.01); *G01J 2003/2859* (2013.01)

(58) Field of Classification Search
CPC ........ G01J 3/28; G01J 3/18; G01J 3/44; G01J 3/42; G01J 2003/2859; G01N 21/554
See application file for complete search history.

(56) References Cited

U.S. PATENT DOCUMENTS 7,217,574 B2    5/2007 Pien et al.
10,254,216 B2 *  4/2019 Sieben .................. G01N 21/05
(Continued)

OTHER PUBLICATIONS

Abumazwed, Enhancing data extraction from localized surface plasmon resonance biosensors. McGill University (Canada). PhD Thesis 182pgs. (2017).
(Continued)

*Primary Examiner* — Abdullahi Nur (57) ABSTRACT

A system and method for fording the peak wavelength of the spectrum sensed by an LSPR spectrometer is described herein. The method comprises reading an image representing the reflected/absorbed spectrum, using a mathematical model of the LSPR spectrometer system to estimate a parametric curve representing the absorbance/reflectance spectrum, and adjusting or optimizing the parameters of the parametric curve so as to increase the likelihood of the parametric curve representing the sensed spectrum. Also described herein is a novel method to achieve LSPR peak wavelength signal noise reduction using an adaptive regularization algorithm.

19 Claims, 6 Drawing Sheets

(56) References Cited

U.S. PATENT DOCUMENTS

| | | | |
|---|---|---|---|
| 2009/0004757 A1* | 1/2009 | Yguerabide | C12Q 1/6816 |
| | | | 436/501 |
| 2013/0003070 A1* | 1/2013 | Sezaki | G01N 21/658 |
| | | | 428/156 |
| 2015/0247846 A1 | 9/2015 | Gerion et al. | |
| 2017/0089832 A1* | 3/2017 | Uemura | G01N 21/783 |
| 2017/0219488 A1* | 8/2017 | Fukuda | G02B 5/008 |

OTHER PUBLICATIONS

PCT/CA2022/050291 International Search Report and Written Opinion dated May 10, 2022.

* cited by examiner

SYSTEM AND METHOD FOR FINDING THE PEAK WAVELENGTH OF THE SPECTRUM SENSED BY AN LSPR SPECTROMETER

CROSS-REFERENCE TO RELATED APPLICATIONS

This application is a 371 application of International Application No. PCT/CA2022/050291, filed Mar. 1, 2022, which claims benefit of priority to U.S. Pat. App. Ser. No. 63/158,214, filed on Mar. 8, 2021, which are incorporated herein by reference.

TECHNICAL FIELD

The invention relates to the field of localized surface plasmon resonance (LSPR) spectrometry. More specifically, the invention relates to a system and method for determining the peak wavelength in a spectrum sensed by an LSPR spectrometer and novel method for reducing the noise of the peak wavelength signal.

A localized surface plasmon resonance (LSPR) spectrometer is a chemical analysis spectrometer in which ligand protein molecules are immobilized onto nanoparticles such as gold nanoparticles. The molecule to be analyzed, known as the analyte, binds to the ligand, causing a shift in LSPR resonant frequency of the nanoparticle. This resonant frequency is probed using absorbance/reflectance spectrometry, and is seen as a peak in the frequency/wavelength of the absorbance/reflectance. The peak wavelength signal as a function of time can be analyzed to evaluate the binding kinetics and other chemical parameters associated with the analyte and the ligand.

The invention provides systems and methods for finding the peak wavelength of the spectrum sensed by an LSPR spectrometer is described herein. The method comprises reading an image representing the reflected/absorbed spectrum, using a mathematical model of the LSPR spectrometer system to estimate a parametric curve representing the absorbance/reflectance spectrum, and adjusting or optimizing the parameters of the parametric curve so as to increase the likelihood of the parametric curve representing the sensed spectrum. Also described herein is a novel method to achieve LSPR peak wavelength signal noise reduction using an adaptive regularization algorithm.

Definitions 1.1. Acronyms
"AuNPs" refers to "gold nanoparticles."
"LHS" means "left hand side."
"LSPR" means "localized surface plasmon resonance."
"RHS" means "right hand side."

1.2. General Definitions
"Absorbance spectrum" is the ratio of the spectrum of light absorbed by the LSPR gold nanoparticles to the uniform input light spectrum incident on them.
"Core-shell nanoparticles" means nanoparticles that consist of a core particle encapsulated by a shell.
"Localized surface plasmon resonance" means the collective oscillation of electrons at the interface of metallic structures.
"Nanoparticles" means particles with one or more dimensions less than 100 nm.
"Particles" means particles with one or more dimensions greater than 100 nm.

"Reflectance spectrum" means the ratio of the spectrum of light reflected from the LSPR gold nanoparticles to the uniform input light spectrum incident on them.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EMBODIMENTS

The invention provides systems and methods for finding the peak wavelength of the spectrum sensed by an LSPR spectrometer is described herein. In one aspect, the method includes:
a) reading an image representing the reflected/absorbed spectrum;
b) using a mathematical model of the LSPR spectrometer system to estimate a parametric curve representing the absorbance/reflectance spectrum; and
c) iteratively or otherwise, adjusting or optimizing the parameters of the parametric curve so as to increase the likelihood of the parametric curve representing the sensed spectrum.

Figure 1:
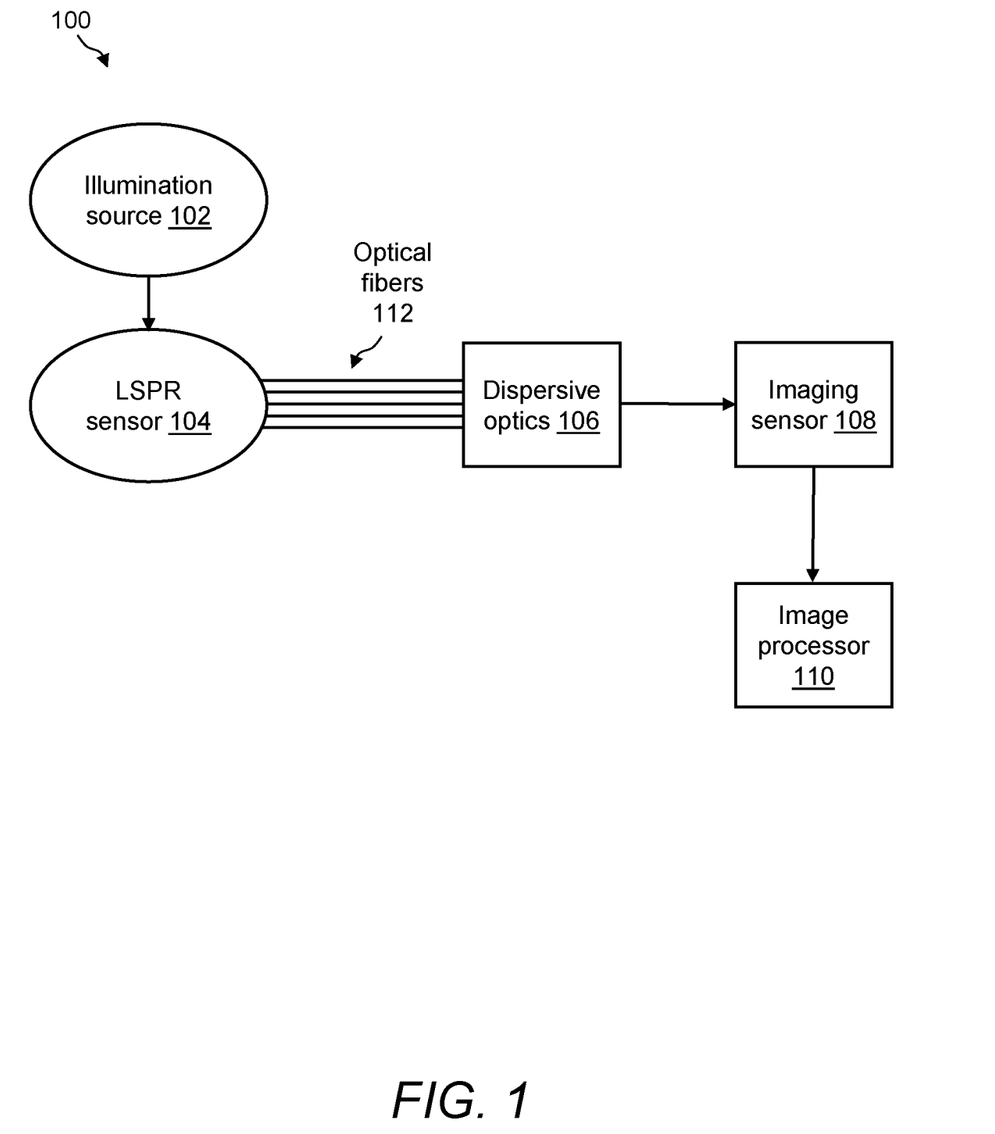
FIG. 1 illustrates an exemplary LSPR spectrometer system according to principles described herein.

FIG. 1 illustrates an exemplary LSPR spectrometer system 100. The Local Surface Plasmon Resonance (LSPR) spectrometer is used in the art to determine by using a computer to calculate the chemical affinity between a pair of molecules or bodies such as proteins, antigens, antibodies, drugs, etc. The LSPR spectrometer system 100 comprises an LSPR sensor 104, having gold nanoparticles (AuNPs) deposited on its surface. In an embodiment, nanoparticles other than gold nanoparticles may be provided. One of the bodies to be analyzed may be immobilized on the AuNPs while the other body may be introduced in the form of a fluid. The binding between the two bodies changes the optical properties of the AuNPs, causing a shift in the peak absorbance as well as reflectance spectra of the AuNPs. An illumination source 102 may be used to shine light of a known spectrum onto the LSPR sensor 104. The reflected/transmitted light from the LSPR sensor 104 may be coupled to optical fibers 112 and channeled to a dispersive optics

106. The dispersive optics 106 comprises elements such as a diffraction grating which separates the light from the optical fibers 112 into its constituent wavelengths. This dispersed light then falls on an imaging sensor 108. In an embodiment, the imaging sensor 108 is a camera. The imaging sensor 108 maps the dispersed light onto a 2D area of pixels which may then be analyzed by an image processor 110. The 2D image may be composed of a horizontal array of spectral information, the spread due to optical diffraction described by G below, and vertical columns of the angle of incident light. The spectral information is along the horizontal direction. Typically, one would simply average or sum the pixels along the vertical direction to give a 1D spectrum. At this point, the image processor 110 could take the maxima over the row of pixels and report that as peak reflectance/absorbance wavelength of the AuNPs in the LSPR sensor 104. However, this method may be too coarse an estimate to be of any practical use. Using the maximum pixel value per row of image sensor data provides a very coarse wavelength resolution of approximately 500 pm, where the ideal target resolution would be less than 1 pm. Therefore, instead, the image processor 110 estimates the wavelength peak at a sub-pixel level using a choice of algorithms such as maximum likelihood peak fitting, described below, achieving a wavelength resolution of less than 5 pm. With our algorithm we achieve peak wavelength resolution of one one-hundredth of the pixel.

In an embodiment, the image processor 110 may be a dedicated hardware designed to perform the image processing task. In another embodiment, the image processor 110 may be a computer running a program which performs the computations for estimating the peak reflectance/absorbance wavelength of the LSPR sensor 104.

Figure 2:
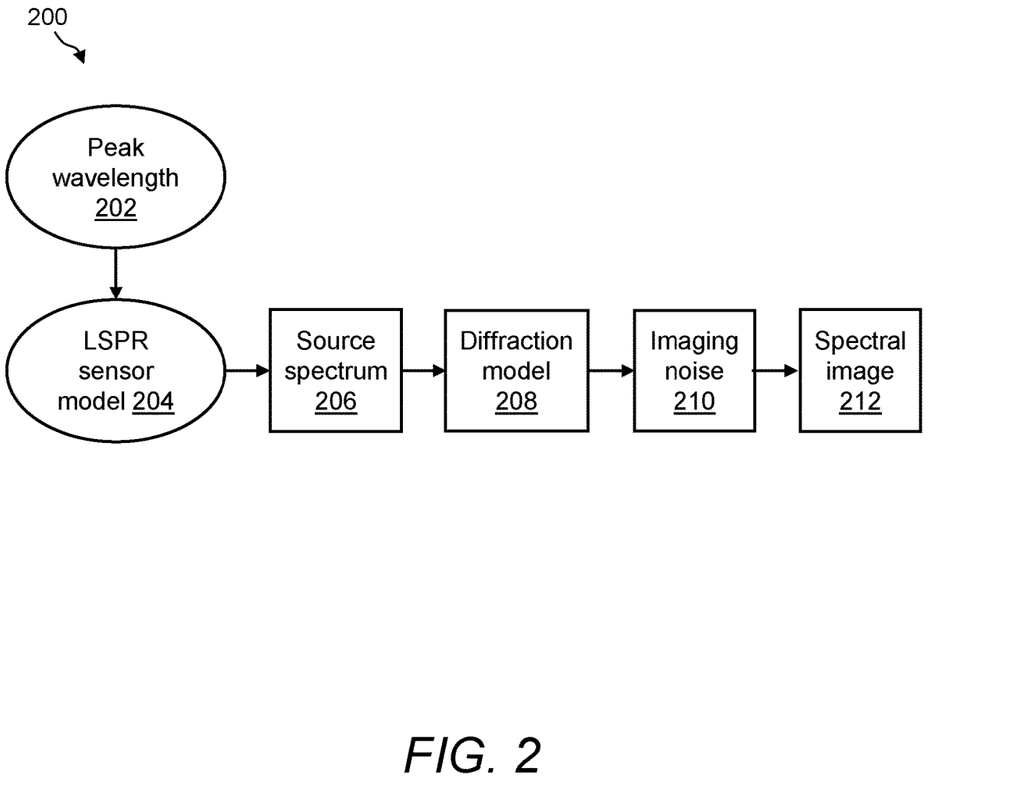
FIG. 2 illustrates an exemplary mathematical model of an LSPR spectrometer system according to principles described herein.

FIG. 2 illustrates a mathematical model 200 of the LSPR spectrometer system 100. A peak wavelength 202 obtained as described with reference to FIG. 1, represents the peak wavelength of the LSPR sensor 104 and is an input to the LSPR sensor model 204. The LSPR sensor model 204 (or R below) models the reflectance/absorbance spectrum of the LSPR sensor 104. The reflectance/absorbance spectrum is dependent on the peak wavelength 202.

In an embodiment, the reflectance/absorbance spectrum of the LSPR sensor 104 may be modeled as a function of the model 204:

$$R = a + bf(c,d),$$

where a, b, c and d are parameters of the model and f is a known function involving the peak wavelength. The peak of R comes from the peak of $f(c,d)$ which encompasses the peak wavelength 202. The maximum value of R will depend on parameters a, b, c and d. In an embodiment, the parameters a and b represent an arbitrary base and scale respectively.

In a preferred embodiment, the function $f(c,d)$ is determined using a computer to calculate the Mie scattering theory applied to AuNPs. Mie scattering theory is a solution to the Maxwell's equations that describes the scattering of an electromagnetic wave by a homogeneous spherical particle having a refractive index (Ri) different from that of the medium surrounding it. Mie theory can also be applied to non-homogeneous core-shell spheres. In the LSPR case, the AuNP forms the core, while the ligand and bound analyte together form the shell. As the shell thickness or refractive index changes, Mie theory predicts a change in the scattering properties of the nanoparticles. It also predicts a shift in the wavelength peak. The parameters c and d represent shell thickness and shell refractive index or some functions of these quantities.

In another embodiment, the function $f$ is modeled as a log-normal function. A log-normal function is the probability distribution function of a random variable where the logarithm of that function is normally distributed. So, if Y is normally distributed, then X, such that $Y=\ln(X)$, is log-normally distributed. Function $\ln(\ )$ represents the natural log. The mathematical expression for log normal function is as follows:

$$p(\omega) = \frac{1}{\omega\sigma\sqrt{2\pi}} e^{\frac{-(\ln(\omega)-\mu)^2}{2\sigma^2}}$$

For log-normal function, it's maxima can be found at:

$$\omega_{max} = e^{(\mu-\sigma^2)}$$

Considering parameters $c=\mu$ and $d=\sigma$, the function $f$ can be re-written as $$f(c,d) = \frac{1}{\omega d\sqrt{2\pi}} e^{\frac{-(\ln(\omega)-c)^2}{2d^2}}$$

In an embodiment, the parameters of $f$ are defined as: $c=e^\mu$ and $d=e^\sigma$. The function $f$ can then be written as $$f(c,d) = \frac{1}{\omega \ln(d)\sqrt{2\pi}} e^{\frac{-(\ln(\omega)-\ln(c))^2}{2(\ln(d))^2}}$$

Source spectrum 206 represents the spectrum provided by the illumination source 102 on the LSPR sensor 104. The reflectance/absorbance spectrum R (model 204) is multiplied with the source spectrum 206 to give a reflected/absorbed spectrum of light. Thus, reflected/absorbed spectrum of light is given by:

$$r = S(a + bf(c,d)),$$

where S represents the illumination source spectrum.

The effects of dispersive optics 106 are modeled by the diffraction model 208. In an embodiment, the diffraction model 208 is a convolution. In an embodiment, the convolution kernel is modeled as the area of a circle convolved with a 1D Gaussian function. The circle represents the exit surface of the fiber optics and the Gaussian represents the dispersion due to the optical components. Thus, the effect of the dispersive optics on the reflected/absorbed spectrum of light can be represented as a 2D convolution operator G:

$$m = G*S(a+bf(c,d)), \quad (1)$$

where G represents the convolution kernel of the dispersive optics. In an embodiment, G is modeled as the convolution of a discrete 2D function of the area of a circle, which is 1 inside a circle and 0 outside the circle, with a Gaussian distribution.

The parameter m represents the modeled spectral image as opposed to the actual spectral image recorded by the imaging sensor 108. Due to physical limitations as well as the limitations of the imaging sensor 108, the model spectral image m, in equation (1) above, is perturbed by an imaging noise 210. The imaging noise 210 comprises one or more of photon noise, quantization noise, dark noise, additive white noise, etc.

In an embodiment, the imaging noise 210 comprises photon noise only. The number of photons falling on each pixel of the imaging sensor 108 is different in each exposure interval. This variation, also called the photon noise, typically follows a Poisson distribution. For a Poisson distributed photon noise and an expected pixel value of $m_i$, the probability of observing pixel value $x_i$ in data is given by:

$$p(x_i|m_i) = \frac{m_i^{\frac{x_i}{k}} e^{-m_i}}{\frac{x_i}{k}!},$$

where k is the number of digital levels per photon—also known as analog gain of the imaging sensor 108.

The dispersed and noise perturbed reflected/absorbed light data is stored in the imaging sensor 108 as spectral image 212. The data stored in spectral image 212 are the pixel intensity values obtained from the image sensor 108 by the image processor 110. Even if values do not change in subsequent m (the modeled spectral image), the actual image pixel values will be different in each subsequent image owing to random photon noise. In the sections below we describe how the maximum likelihood formulation attempts to find the modeled spectral image, m, which increases, e.g., maximizes the likelihood of seeing the observed pixel intensity values of the actual image.

Figure 3:
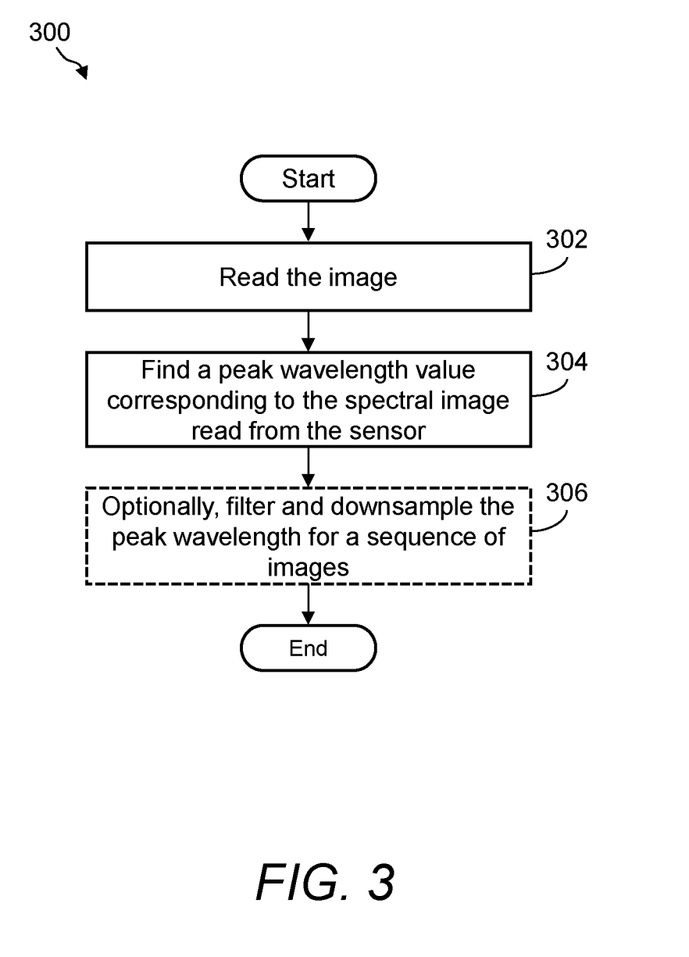
FIG. 3 illustrates an exemplary image processing method to find the peak wavelength signal from a series of spectral images sensed by an LSPR spectrometer, according to principles described herein.

FIG. 3 illustrates an exemplary image processing method 300 to find the peak wavelength signal from a series of spectral images sensed by the LSPR spectrometer system 100. The image processing method 300 comprises a step 302 of reading an image from imaging sensor 108. In an embodiment, the image from imaging sensor 108 comprises multiple separate reflected/absorbed spectra, corresponding to different binding events. Each of these spectra are separated and processed separately. After reading a spectrum, the peak wavelength value corresponding to the read spectrum is found in a step 304. In an embodiment, step 304 is repeated for each spectrum in the image captured by imaging sensor 108. In an embodiment, the peak wavelengths for the spectra in each image, are filtered and downsampled as in optional step 306. In an embodiment a low pass filter is used for filtering. In another embodiment an edge-adaptive low pass filter is used for filtering. In an embodiment, a median filter is used for down-sampling.

Figure 4:
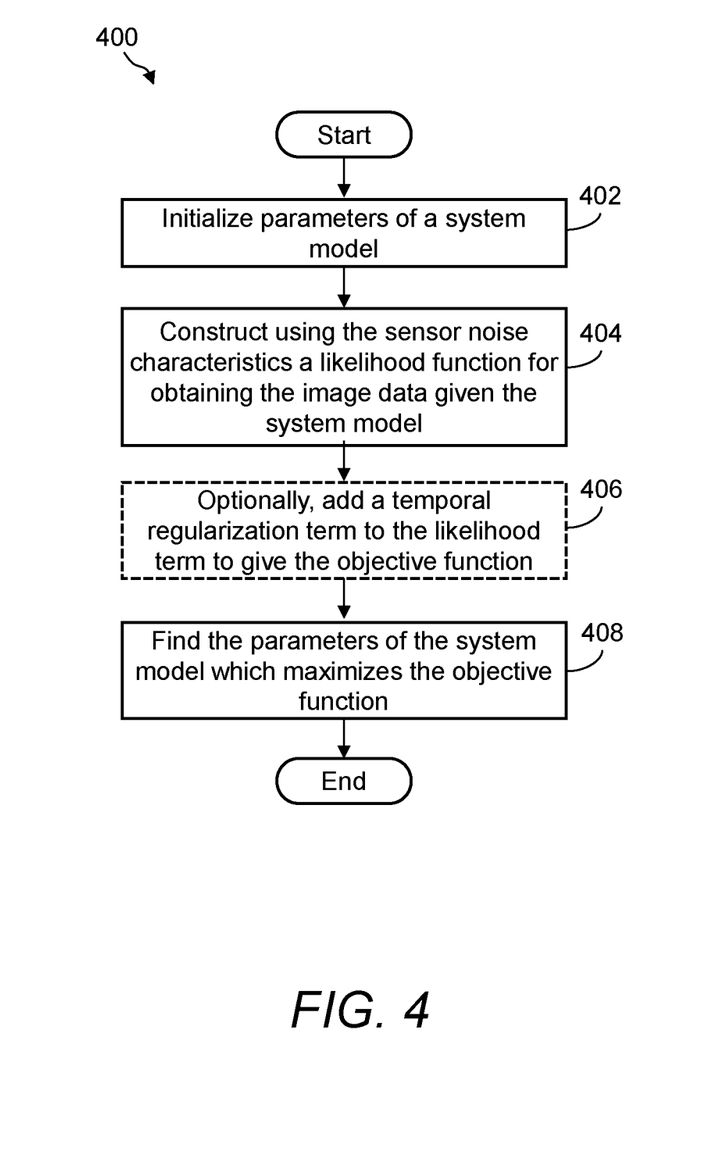
FIG. 4 illustrates an exemplary method to find the parameters of a mathematical model of an LSPR spectrometer system which best represent the spectral image sensed by the LSPR spectrometer in the maximum likelihood sense, according to principles described herein.

FIG. 4 illustrates an exemplary method 400 to find the parameters of the mathematical model of the LSPR spectrometer system 100 which best represents the spectral image sensed by the LSPR spectrometer. The method begins by initializing the parameters a, b, c and d of the model reflection/absorption spectrum, in step 402. In an embodiment, the parameters c and d are initialized as $e^{4.86}$ and $e^{0.1}$ respectively for the first image. Given these c and d values, the function $f(c,d)$ can be found as described above using the log-normal function approximation for the Mie scattering theory. Furthermore, the parameters a and b are initialized by finding the best intercept and slope for a linear fit between sensed spectrum pixel values (y) and modeled spectrum m, where m is defined above in equation 1. Once G, S, $f(c,d)$ are known, simple matrix equations can be used to find the error (y-m) as a function of a and b. Matrix manipulations are then performed using a computer to calculate the values of a and b which minimize the error. In another embodiment, the a, b, c and d parameters are initialized using parameter values from a previous image, i.e., outputs of method 400 corresponding to an earlier image. In another embodiment, one or more of the parameter values are obtained by fitting a model spectral image to the read spectral image using a least squares linear regression. Given an initial value of c and d, an equation form is calculated by computer at each pixel as a function of a and b. The function can be written as $y=bM1\cdot f(c,d)+aM1$, where the sensed spectrum pixel value is y, the slope of the function is $bM1\cdot f(c,d)$ and the intercept or offset is aM1. M1 is G*S explained above, where G is a convolution operator modelling the optical dispersion and S is the source light spectrum. The goal of this embodiment is to calculate by a computer the values of a and b such that the function most closely approaches the observed spectrum pixel value, y, as possible.

Step 402 is followed by a step 404 of constructing a maximum likelihood function for obtaining the read spectral image, given the initial parameter values found in step 402. In an embodiment, the photon noise is the most dominant sensor noise and the other forms of noise are ignored. In this case, $m=G*S(a+bf(c,d))$ is the expected value of the 2D spectral image. The actual pixel values would be perturbed by a Poisson distributed photon noise.

As the noise follows a scaled Poisson distribution, the probability of observing the particular pixel value $x_i$, given expected value $m_i$ is given as follows:

$$p(x_i|m_i) = \frac{m_i^{\frac{x_i}{k}} e^{-m_i}}{\frac{x_i}{k}!}$$

where k=analog gain and i iterates over pixels.

Thus, the total probability of observing the sensor image, given expected value $m_i$ at pixel i is given by the product of probability for each pixel as shown in equation (2) below.

$$p(x|m) = \prod_i \frac{m_i^{\frac{x_i}{k}} e^{-m_i}}{\frac{x_i}{k}!} \tag{2}$$

As the logarithm function is monotonic, taking the logarithm of a function preserves its maxima, i.e, $\mathrm{argmax}_x f(x) = \mathrm{argmax}_x \ln(f(x))$.

Taking the natural logarithm on both sides of the equation (2) results in the following equation:

$$\ln(p(x|m)) = \sum_i \left( \frac{x_i}{k} \ln(m_i) - m_i - \ln\left(\frac{x_i}{k}!\right) \right)$$

The last term in the summation does not change with any of the parameters a, b, c or d. Since the constant term will not affect the maxima, it can be omitted. Thus, the likelihood function for maximization would be equation (3) shown below.

$$\ln(p(x|m)) = \sum_i \left( \frac{x_i}{k} \ln(m_i) - m_i \right) = P_{log} \tag{3}$$

In an embodiment, the likelihood formulation derived above is directly used as the objective function for parameter estimation. Optionally, the likelihood function could be formulated such that the estimated parameter values and hence peak wavelength values are more regular. Here regular implies that the values are not completely devoid of any structure. Depending on the amount of noise, estimated parameters and hence estimated peak wavelengths could vary quite a bit from one spectral image to another, with the variation showing up as noise in the wavelength peak signal. A structure could be defined which does not allow the peak wavelengths to vary significantly from one frame to the next. This reduces the noise in the temporal peak wavelength signal. Such a structure could be added to the likelihood formulation itself.

In an embodiment, the option is available to add a temporal regularization term to the likelihood term, in step 406. The Bayesian estimation technique allows the specification of a distribution on the expected pixel values m. According to the Bayesian formulation:

$$p(m|x) = \frac{p(x|m)p(m)}{p(x)}$$

Taking the natural logarithm of both sides of the above equation produces the following equation:

$$\ln(P(m|x)) = \ln(p(x|m)) + \ln(P(m)) - \ln(P(x)).$$

The last term does not depend on the parameters and can be ignored for optimization e.g., maximization. Thus, it can be written as:

$$\mathrm{argmax}_m[\ln(p(m|x))] = \mathrm{argmax}_m[\ln(p(x|m)) + \ln(p(m))] \quad (4).$$

The first term on the RHS is equal to the LHS of equation (3). The second term specifies a structure on m and in turn a structure on peak wavelength signal. In an embodiment, the Wiener-Khinchin-Einstein theorem is used to formulate this structure.

The Wiener-Khinchin-Einstein theorem states: Given a wide-sense stationary random process M, there exists a causal filter g and a stationary random process W, such that M=W*g and W is white noise.

In an embodiment, the peak wavelength signal is assumed to change very gradually. It is expected that the high frequency content in the peak wavelength signal is very low. So, the suitable filter to be used would be a low pass filter. A pure autoregressive filter with a pole at 0 frequency has a suitable frequency response and also simplifies the math. Consider an autoregressive filter g with the following recurrence equation:

$$m[n] = w[n] - (c_1 m[n-1] + c_2 m[n-2] \ldots c_k m[n-k])$$
Thus, $w[n] = m[n] + c_1 m[n-1] + c_2 m[n-2] \ldots c_k m[n-k] w[n] = \Sigma_i c_i m[n-i]$ In an embodiment, the white noise process, W, is an IID (independent and identically distributed) Gaussian white noise process, where in the gaussian distributed white noise process equation, $-w^2/n$ represents $(x-\mu)^2$ with $\mu=0$. The probability distribution function would be expressed as:

$$p_W(w) = ce^{\frac{-w_n^2}{2\sigma^2}} = p_M(m)$$

Thus, $$p_M(m) = ce^{\frac{-\Sigma_i(c_i m[n-i])^2}{2\sigma^2}}$$

Thus, $$\ln(p_M(m)) = C_1 + C_2 \Sigma_i (c_i m[n-i])^2$$

Constant $C_1$ does not affect the maxima and can be ignored. Substituting the above relationships in equations (3) and (4), $$\mathrm{argmax}_m[\ln(p(m|x))] = \mathrm{argmax}_m\left[\sum_i \left(\frac{x_i}{k}\ln(m_i) - m_i\right) + C_2 \sum_j (c_j m[n-j])^2\right]$$

Here, index i iterates over spectral image pixels, while j iterates over the temporal spectral image sequence.

Thus, the objective function to be increased, e.g., maximized, is:

$$P = \sum_i \left(\frac{x_i}{k}\ln(m_i) - m_i\right) + C_2 \sum_j (c_j m[n-j])^2 \quad (5)$$

$C_2$ represents the relative scale between the regularization term and the likelihood term.

In an embodiment, the value of $C_2$ is fixed. In an embodiment, $C_2$ is adapted based on the expected trend of the peak wavelength signal.

The objective function derived after step 404 or optionally, after step 406 having the maximum likelihood is obtained in step 408. Algorithms known in the art, such as gradient descent, conjugate gradient, newton method, etc. can be used for finding the maxima. The peak wavelength corresponding to the parameter values at maxima represents the peak wavelength for the spectral image.

The greater the value of $C_2$, the smaller is the variation in the estimated peak wavelength signal. Thus, high $C_2$ is desirable when no binding events are happening at the LSPR sensor and the variation in peak wavelength signal is purely stochastic. On the other hand, a low $C_2$ is desirable when the estimated peak wavelength signal needs to track fast changes in the peak wavelength due to binding events at the LSPR sensor.

Figure 5:
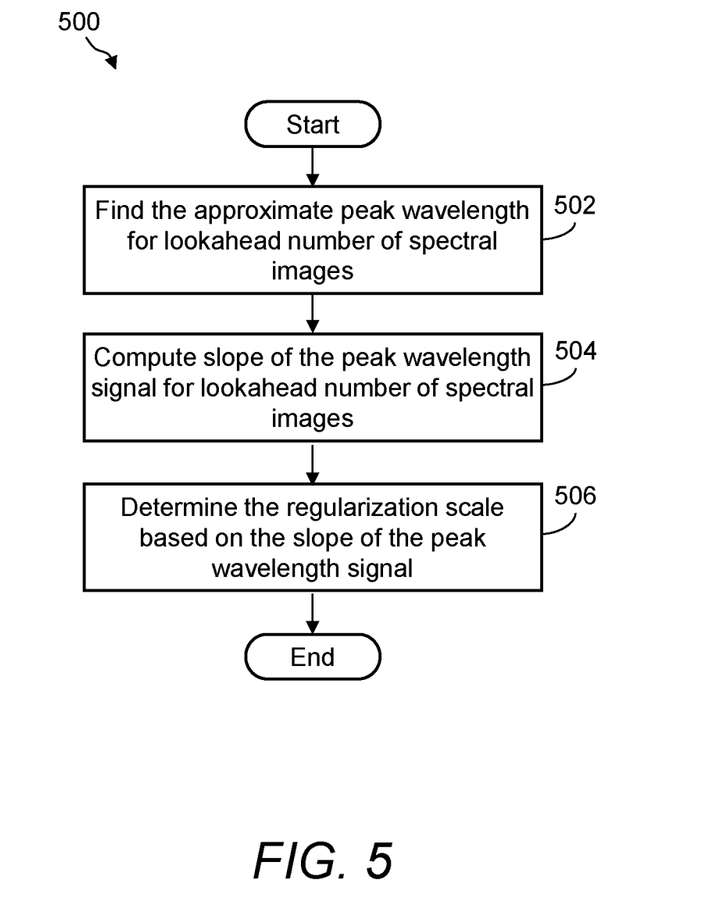
FIG. 5 illustrates an exemplary method to find the adaptive regularization scale, according to principles described herein.

FIG. 5 illustrates an example method 500 of finding an adaptive regularization scale. At the chemical level in an LSPR measurement, one might see a small but noisy variation in maximum peak wavelength as one progresses through frames. There is a sudden large step function jump in peak wavelength signal when the LSPR system detects a change in the chemical composition around the AuNP chip. Ideally, we want to see such a step change as the output. The adaptive regularization method 500 is primarily a step taken to reduce noise in the plot of peak wavelength signal as a function of frame number. This adaptive regularization process ensures only the noise is reduced, while leaving the actual or real peak wavelength variations intact. A step 502 comprises finding the approximate peak wavelength values for a lookahead number of spectral images in the vicinity of the spectral image under consideration. In one embodiment, a linear regression is calculated using a computer to determine the best fit line passing through pairs of data points of the frame number and the approximate peak wavelength of that frame. The higher the absolute value of slope, the more likely it is that there is an underlying binding event happening at the sensor. In that case the regularization scale is reduced, allowing the algorithm more flexibility in finding the true peak wavelength. Conversely, if the slope is low, it means that the variation in peak wavelength is mostly random and so the regularization scale is increased, compelling the algorithm to find peak wavelengths in a narrow range.

In another embodiment, the approximate value of peak wavelength is found by fitting an analytical function to the spectral image and then finding the maxima of that analytical function. In an embodiment, the analytical function is the Gaussian function. In another embodiment, the analytical function is a log-normal function.

In an embodiment, approximate peak wavelength is found by successively relaxing parameters a, b and d from equation (3). Successive relaxation involves modifying a parameter value for minimizing the sum of the squared error between the estimate and spectral image. In the implementation, the best fit for parameters a and b is obtained using the algorithm as described for FIG. 4, where the parameters are initialized for the fast image. Subsequently, the parameter d is relaxed by using the Newton method described below for FIG. 6, while keeping parameters a, b and c constant. In this use of the Newton method there is only one variable parameter, d; therefore, only derivatives with respect to d are needed. This sequence of relaxing parameters a, b and then d is repeated until a stopping condition is reached. The derivative with respect to d computed in the Newton method is examined and a stopping condition is reached if the value of derivative with respect to d falls below a certain threshold. Intuitively, this means the error will not change much even if the parameter d is changed considerably.

In an embodiment the approximate peak wavelength values are stored for future use.

After finding the approximate peak wavelength values for a lookahead number of spectral images, the approximate slope of the peak wavelength signal is found in step 504. The approximate slope is the slope of the best fit (least squares) line passing through the lookahead number of approximate peak wavelength values.

A step 506 computes the adaptive regularization scale by evaluating a particular function of the slope from step 504. In an embodiment the function is a binary function giving two distinct values of regularization scale across a range of values of slope. In an embodiment, the function is a discrete function giving n distinct values of regularization scale across a range of values of slope. In an embodiment, the function is a linear function from slope to regularization scale. In an embodiment, the function from slope to regularization scale is bounded by an experimentally calculated quadratic function, using a computer, defined as follows: $C_2 = C^{max}_2(1-25*\max(\text{slope}^2, 0.04))$, where $C^{max}_2$ is the maximum value that $C_2$ can take. This formula ensures that the maximum value of $C_2$ is equal to $C^{max}_2$. In addition, this formula ensures that the $C_2$ saturates at a slope equal to 0.2 and is zero for all higher slopes. The slope of 0.2 was calculated experimentally using a computer and determined to be a good saturation level. Finally, $C_2$ depending quadratically on slope performed better than linear dependence.

Figure 6:
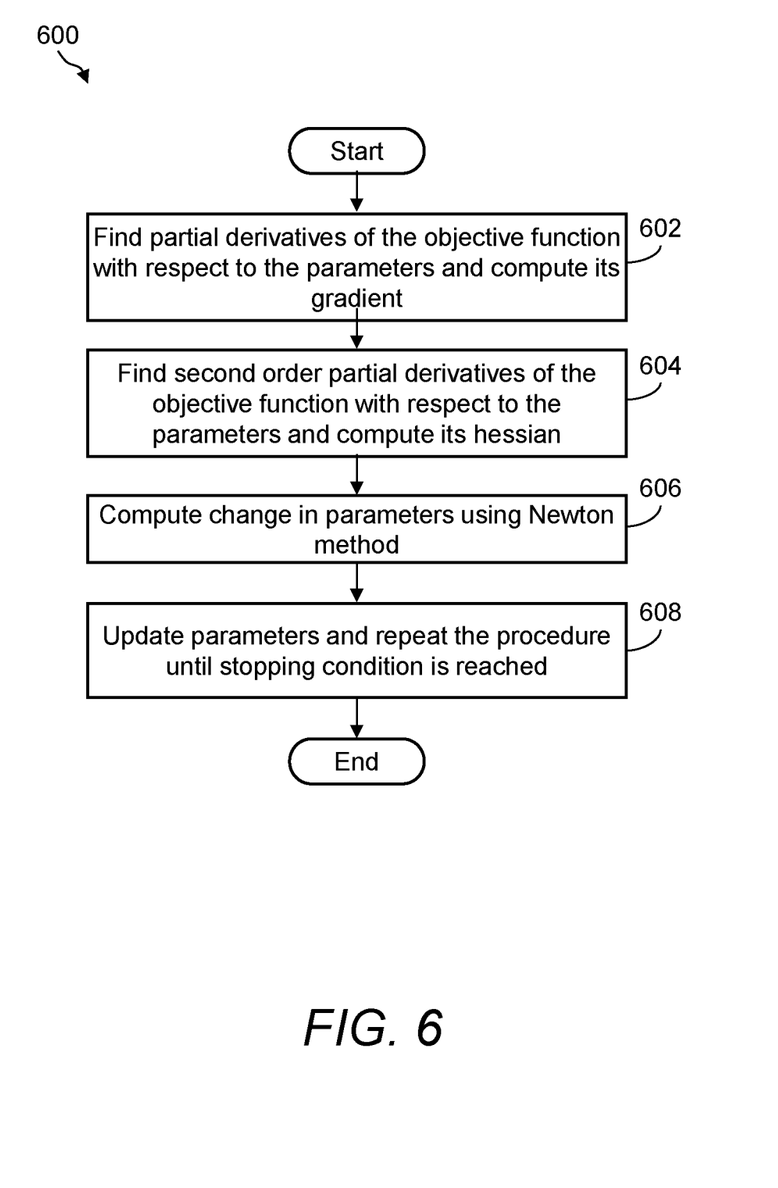
FIG. 6 illustrates an exemplary method to adjust or optimize the parameters of a mathematical model of an LSPR spectrometer system using the Newton method, according to principles described herein.

FIG. 6 illustrates an exemplary method 600 to adjust or optimize the parameters of a mathematical model of the LSPR spectrometer system 100 using the Newton method, according to principles described below. In an embodiment, the objective function is defined by equation (3) above. In an embodiment, the objective function is defined by equation (5) above. Method 600 comprises a step 602 of taking first order partial derivatives of the objective function with respect to the parameters, to find the gradient of the objective function. In an embodiment where the objective function is defined by equation (3), the gradient can be expressed as follows:

$$P_{log} = \sum_i \left(\frac{x_i}{k}\ln(m_i) - m_i\right) \text{ and } m = G*S(a + bf(c, d)).$$

By chain rule, $$\frac{\partial P_{log}}{\partial a} = \frac{\partial P_{log}}{\partial m}\frac{\partial m}{\partial a} \tag{6a}$$

$$\frac{\partial P_{log}}{\partial m} = \sum_i \left(\frac{x_i}{km_i} - 1\right) \tag{6b}$$

$$\frac{\partial m}{\partial a} = G*S \tag{6c}$$

$$\frac{\partial m}{\partial b} = G*Sf(c, d) \tag{6d}$$

$$\frac{\partial m}{\partial c} = G*Sb\frac{\partial f}{\partial c} \tag{6e}$$

$$\frac{\partial m}{\partial d} = G*Sb\frac{\partial f}{\partial d} \tag{6f}$$

and finally, the gradient:

$$\nabla P_{log} = \left[\frac{\partial P_{log}}{\partial a}, \frac{\partial P_{log}}{\partial b}, \frac{\partial P_{log}}{\partial c}, \frac{\partial P_{log}}{\partial d}\right]$$

Method 600 further comprises a step 604 of taking second order partial derivatives of the objective function with respect to the parameters, to find the hessian matrix of the objective function. The chain rule can be applied to equations 6a-f to obtain second order derivatives. Finally, the hessian matrix can be written as follows:

$$\text{hessian}(P_{log}) = \begin{bmatrix} \frac{\partial^2 P_{log}}{\partial a^2} & \frac{\partial^2 P_{log}}{\partial a \partial b} & \frac{\partial^2 P_{log}}{\partial a \partial c} & \frac{\partial^2 P_{log}}{\partial a \partial d} \\ \frac{\partial^2 P_{log}}{\partial a \partial b} & \frac{\partial^2 P_{log}}{\partial b^2} & \frac{\partial^2 P_{log}}{\partial b \partial c} & \frac{\partial^2 P_{log}}{\partial b \partial d} \\ \frac{\partial^2 P_{log}}{\partial a \partial c} & \frac{\partial^2 P_{log}}{\partial b \partial c} & \frac{\partial^2 P_{log}}{\partial c^2} & \frac{\partial^2 P_{log}}{\partial c \partial d} \\ \frac{\partial^2 P_{log}}{\partial a \partial d} & \frac{\partial^2 P_{log}}{\partial b \partial d} & \frac{\partial^2 P_{log}}{\partial c \partial d} & \frac{\partial^2 P_{log}}{\partial d^2} \end{bmatrix}$$

Using the gradient and hessian 4×4 matrix, a step 606 is performed to compute the change in parameters using the Newton method as described below.

$$[\delta a, \delta b, \delta c, \delta d] = \text{step}*\text{hessian}^{-1}(P_{log})\nabla P_{log}$$

where step is a real number constant chosen so as to prevent the parameter values from diverging. In an embodiment, the constant step is equal to 1. A step 608 updates the parameter values as follows:

$$a_{new} = a_{old} + \delta a, b_{new} = b_{old} + \delta b, C_{new} = /C_{old} + \delta c \text{ and } d_{new} = d_{old} + \delta d.$$

The procedure for updating the parameter values is iterated until the stopping condition is reached. In an embodiment, the stopping condition is defined as follows:

$$\frac{\delta a}{a_{old}} + \frac{\delta b}{b_{old}} + \frac{\delta c}{c_{old}} + \frac{\delta d}{d_{old}} < c_{stop},$$

where $c_{stop}$ is a predefined constant. In an embodiment, $c_{stop}=1\times10^{-4}$.

Once the optimal parameters for the mathematical model of the LSPR spectrometer system have been obtained using method 600, a separate step is performed where the peak wavelength signal with reduced noise is analyzed by downstream software to gauge the reaction kinetics parameters for the ligand-analyte pair under test.

Various modifications and variations of the disclosed methods, compositions and uses of the invention will be apparent to the skilled person without departing from the scope and spirit of the invention. Although the invention has been disclosed in connection with specific preferred embodiments, it should be understood that the invention as claimed should not be unduly limited to such specific embodiments. Indeed, various modifications of the disclosed modes for carrying out the invention, which are obvious to the skilled person in view of this specification are intended to be within the scope of the following claims.

The present invention may be implemented using hardware, software, or a combination thereof and may be implemented in one or more computer systems or other processing systems. In one aspect, the invention is directed toward one or more computer systems capable of carrying out the functionality described herein.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission, or display devices. Also, the terms "first," "second," "third," etc., as used herein are meant as labels to distinguish among different elements and may not necessarily have an ordinal meaning according to their numerical designation.

We claim:

1. A method for finding a peak wavelength of a spectrum sensed by a spectrometer comprising:
    providing a sample comprising an analyte;
    analyzing the analyte using SPR analysis to produce a signal;
    using an imaging device to measure and store data from the signal, thereby yielding stored image data; and
    using a computer to:
        estimate from the stored image data a model spectrum representing an absorbance or reflectance spectrum;
        estimate from the model spectrum a mathematical modeling function comprising a parametric curve representing the absorbance/reflectance spectrum; and
        adjust parameters of the parametric curve thereby increasing the likelihood of the model spectrum representing the spectrum sensed by the spectrometer.

2. The method of claim 1, wherein the stored image data represents a reflected or absorbed spectrum of the signal.

3. The method of claim 2, wherein the stored image data comprises a function of an angle of incident light.

4. The method of claim 1, wherein increasing the likelihood of the model spectrum representing the spectrum sensed by the spectrometer comprises maximizing a probability function representing the spectrum sensed by the spectrometer.

5. The method of claim 1, wherein increasing the likelihood of the model spectrum representing the spectrum sensed by the spectrometer comprises maximizing a weighted sum of the probability function representing the spectrum sensed by the spectrometer and a regularization term.

6. The method of claim 5, wherein the regularization term uses an autoregressive filter formulation.

7. The method of claim 5, wherein a weight of the weighted sum is not constant.

8. The method of claim 5, comprising determining the weight of the weighted sum by using the computer to calculate an approximate peak wavelength signal for a lookahead number of spectral images.

9. The method of claim 5, wherein the weight of the weighted sum is determined by using a computer to calculate a slope of the approximate peak wavelength signal for the lookahead number of spectral images.

10. The method of claim 5, comprising determining the weight of the weighted sum by using the computer to calculate a binary modeling function of the slope of the approximate peak wavelength signal for the lookahead number of spectral images.

11. The method of claim 5, comprising determining the weight of the weighted sum by using the computer to calculate a discrete modeling function of the slope of the approximate peak wavelength signal for the lookahead number of spectral images.

12. The method of claim 5, comprising determining the weight of the weighted sum by using the computer to calculate a linear modeling function of the slope of the approximate peak wavelength signal for the lookahead number of spectral images.

13. The method of claim 5, comprising determining the weight of the weighted sum by using the computer to calculate a bounded quadratic modeling function of the slope of the approximate peak wavelength signal for the lookahead number of spectral images.

14. The method of claim 5, comprising maximizing the probability that the model spectrum represents the spectrum sensed by the spectrometer by using the computer to optimize parameters of the modeling function.

15. The method of claim 14, wherein optimizing the parameters of the modeling function comprises using a Newton method to find a minimum of a sum of squared errors between the model spectrum and a spectral image.

16. The method of claim 15, wherein the iterative Newton method comprises successive relaxation of each parameter in the mathematical modeling function.

17. The method of claim 15, wherein the iterative Newton method comprises a stopping condition wherein the minimum of a sum of a squared error between the model spectrum and a spectral image is less than a constant.

18. The method of claim 15, wherein the iterative Newton method comprises a stopping condition wherein the sum over all parameters of the ratio of the change in value to the previous value is less than a constant.

19. The method of claim 1, comprising providing a computer output indicating the peak wavelength of the spectrum sensed by a spectrometer.

* * * * *